United States Patent [19]
McKittrick et al.

[11] Patent Number: 4,718,875
[45] Date of Patent: Jan. 12, 1988

[54] TOY VEHICLE WITH FOLDABLE WHEELS

[75] Inventors: Michael McKittrick, Torrance; David L. Maurer, Lawndale; Howard R. Stern, Redondo Beach, all of Calif.

[73] Assignee: Mattel, Inc., Hawthorne, Calif.

[21] Appl. No.: 882,008

[22] Filed: Jul. 3, 1986

[51] Int. Cl.$^4$ .................................... A63H 17/267
[52] U.S. Cl. .................................. 446/231; 446/469; 446/55
[58] Field of Search ............... 446/55, 230–232, 446/469, 466, 465, 470, 434, 6, 7; 280/39, 40, 43.13

[56] References Cited

U.S. PATENT DOCUMENTS

| | | | |
|---|---|---|---|
| 2,018,527 | 10/1935 | Kerr | 280/39 |
| 2,436,643 | 2/1948 | Hafner | 280/39 |
| 2,616,214 | 11/1952 | Hydrick | 446/55 |
| 2,886,338 | 5/1959 | French | 280/40 |
| 3,182,421 | 5/1965 | Glass et al. | 446/6 X |
| 3,859,752 | 1/1975 | Morrison et al. | 446/6 |
| 4,114,309 | 9/1978 | Gay | 446/232 |
| 4,230,340 | 10/1980 | Wasservogel | 280/656 |

FOREIGN PATENT DOCUMENTS 1483751 8/1977 United Kingdom ............... 446/466

Primary Examiner—Mickey Yu
Attorney, Agent, or Firm—Ronald M. Goldman; Melvin A. Klein; Daniel F. Sullivan

[57] ABSTRACT

A toy vehicle having wheels which may be folded to a horizontal position under the vehicle by squeezing a hand grip. Two elongated axle members are rotatably engaged to the sides of the vehicle. The wheels are rotatably mounted on front and rear axles attached to the elongated axle members. A pivot plate is rotatably mounted to the bottom of the toy vehicle. When the hand grip is squeezed, a link connected to a trigger member causes the plate to rotate. The rotating plate then causes two slotted links to rotate the elongated axle members. As a result, the wheels mounted on the axle members also rotate until they reach a substantially horizontal position under the vehicle. The wheels remain in this folded position until the hand grip is released. When the grip is released, springs return the wheels to a vertical position. The slotted links are designed to allow the wheels at just one side of the toy vehicle to be folded. This feature helps to prevent damage to the toy vehicle, for example, when it is dropped, allowing the wheels at only one of the sides to fold upon impact.

6 Claims, 7 Drawing Figures

TOY VEHICLE WITH FOLDABLE WHEELS

BACKGROUND OF THE INVENTION

The present invention relates generally to toy vehicles and, more particularly, to a toy vehicle having wheels which may be folded to a horizontal position under the vehicle by squeezing a hand grip.

In the past, various ways have been devised for the purpose of folding wheels under different types of vehicles. For example, U.S. Pat. No. 4,230,340 issued to Wasservogel on Oct. 28, 1980 discloses an adapting fitting used to position wheels under a trailer. A complicated mounting used to move the wheels of a vehicle from a vertical to a horizontal position is described in U.S. Pat. No. 2,886,338 issued to French on May 12, 1959. Finally, U.S. Pat. No. 2,018,527 issued to Kerr on Oct. 22, 1935 shows how the wheels of a cart can be folded under the cart by removing locking pins.

None of the above patents discloses a simple, self-contained mechanism which may be used for the purpose of moving the wheels of a toy vehicle to a horizontal position, and allows the wheels at just one side of the vehicle to be folded. A mechanism using a hand grip could be easily operated by a child during play in order to fold the wheels of a toy. Accordingly, there is a need in the toy manufacturing arts for such a toy vehicle having wheels which may be folded to a horizontal position under the vehicle by squeezing a hand grip.

SUMMARY OF THE INVENTION

It is an object of this invention to provide a toy vehicle having foldable wheels.

It is another object of this invention to provide a toy vehicle having wheels which may be folded to a horizontal position under the vehicle by squeezing a hand grip.

It is still another object of this invention to provide a toy vehicle having a mechanism which allows the wheels at just one side of the vehicle to be folded, for example, when the toy is dropped on one of its sides. This feature helps to prevent damage to the toy vehicle during play.

These and other objects and advantages are attained by a toy vehicle having wheels which may be folded to a substantially horizontal position under the vehicle by squeezing a hand grip. Two elongated axle members are rotatably engaged to the sides of the vehicle. The wheels are rotatably mounted on front and rear axles attached to the elongated axle members. A pivot plate is rotatably mounted to the bottom of the toy vehicle. When the hand grip is squeezed, a link connected to a trigger member causes the plate to rotate. The rotating plate then causes two slotted links to rotate the elongated axle members. As a result, the wheels mounted on the axle members also rotate until they reach a substantially horizontal position under the vehicle. The wheels remain in this folded position until the hand grip is released. When the grip is released, springs return the wheels to a vertical position. The slotted links are designed to allow the wheels at just one side of the toy vehicle to be folded. This feature helps to prevent damage to the toy vehicle, for example, when it is dropped, allowing the wheels at only one of the sides to fold upon impact.

The various features of the present invention will be best understood, together with further objects and advantages by reference to the following description of the preferred embodiment taken in connection with the accompanying drawings.

DESCRIPTION OF THE PREFERRED EMBODIMENT

The following specification taken in conjunction with the drawings sets forth the preferred embodiment of the present invention in such a manner that any person skilled in the toy manufacturing arts can use the invention. The embodiment of the invention disclosed herein is the best mode contemplated by the inventors for carrying out their invention in a commercial environment, although it should be understood that various modifications can be accomplished within the parameters of the present invention.

Figure 1:
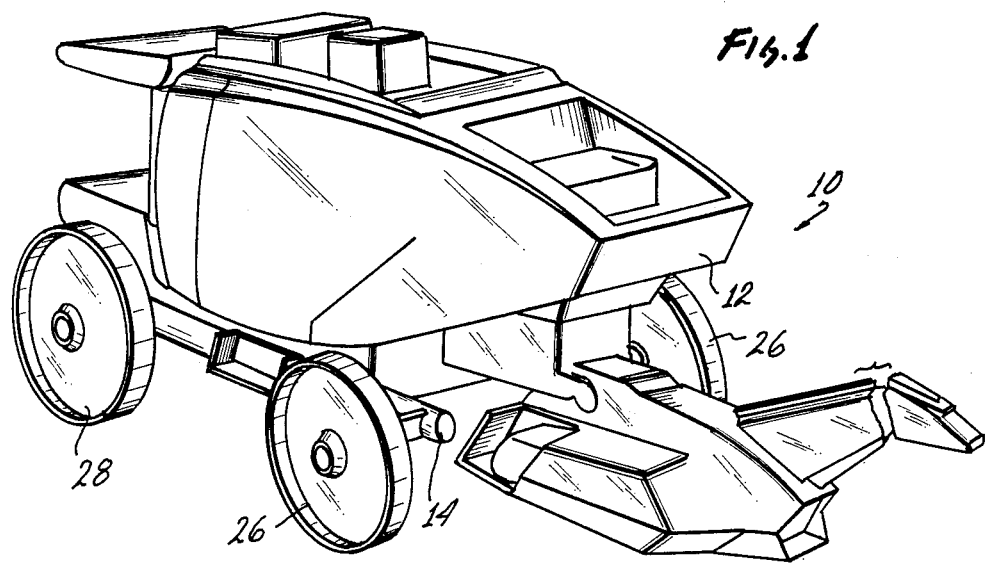
FIG. 1 is a perspective view of the preferred embodiment of the toy vehicle of the present invention.
Figure 3:
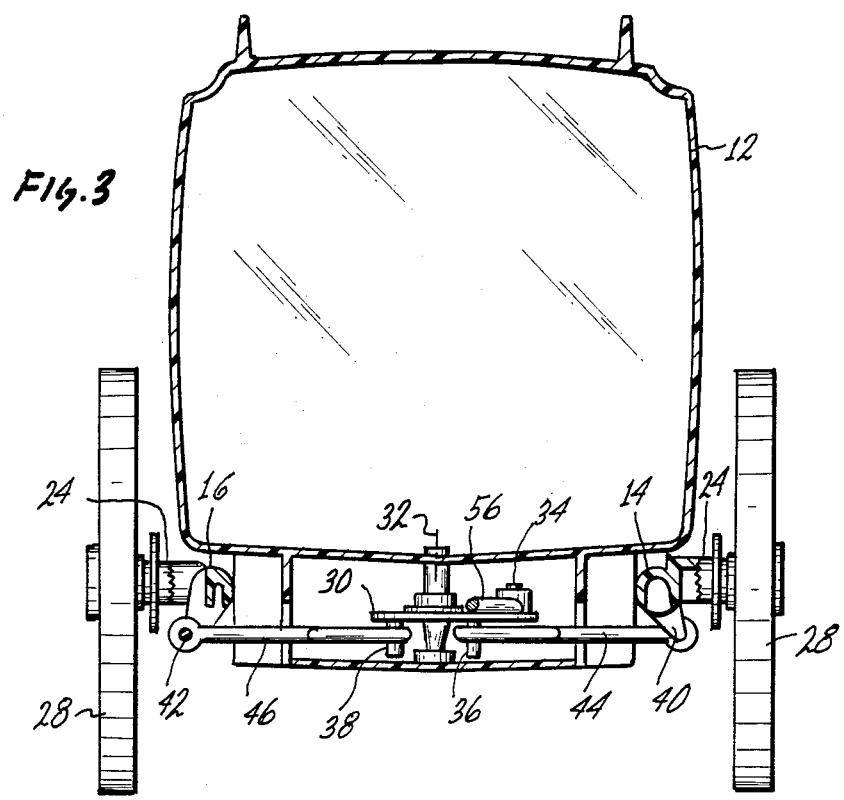
FIG. 3 is a cross-sectional view taken in the direction of arrows 3—3 shown in FIG. 2.
Figure 2:
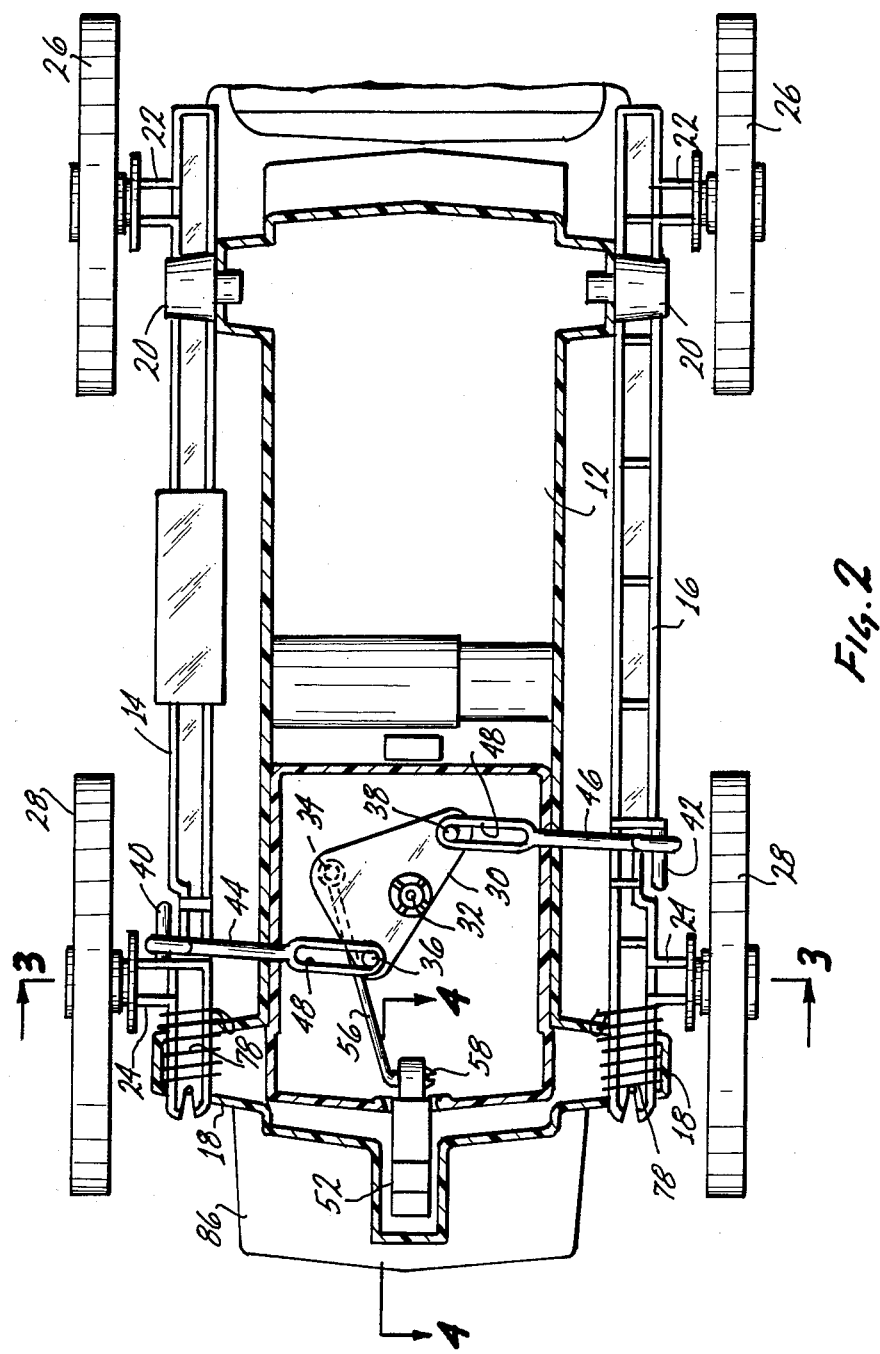
FIG. 2 is a bottom plan view of the toy vehicle of FIG. 1 with part of the vehicle shown in cross-section.

Referring now to the drawings and particularly to FIGS. 1 through 3, a preferred embodiment of the toy vehicle 10 of the present invention is disclosed. The toy vehicle 10 has a body portion 12 which is preferably hollow. Two elongated axle members 14 and 16 rotatably engage extensions 18 and 20 of body portion 12, as shown in FIG. 2, one on each side of the vehicle 10. Note that any alternative means of rotatably engaging members 14 and 16 to body portion 12 may be used if desired. Each of the elongated axle members 14 and 16 has front and rear axles 22 and 24 attached to it. Front and rear wheels 26 and 28 are rotatably mounted on the front and rear axles 22 and 24, respectively.

Figure 6:
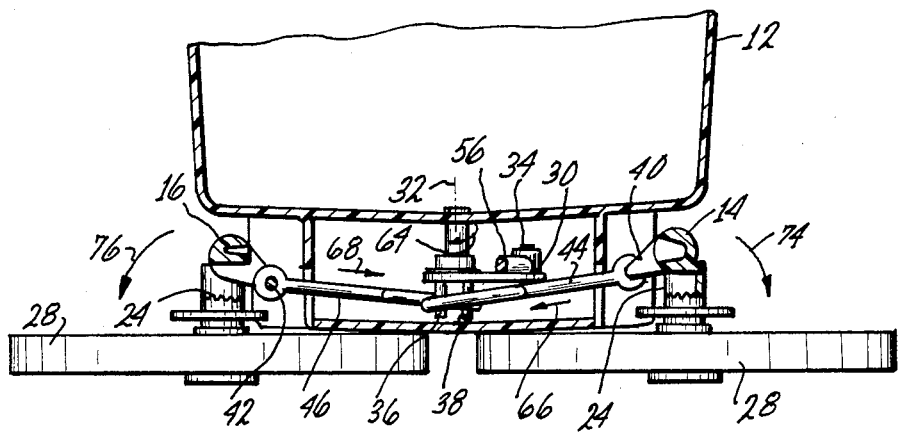
FIG. 6 is a partial rear elevational view of the toy vehicle of FIG. 1 with part of the vehicle shown in cross-section and the wheels of the vehicle shown in a folded position.
Figure 7:
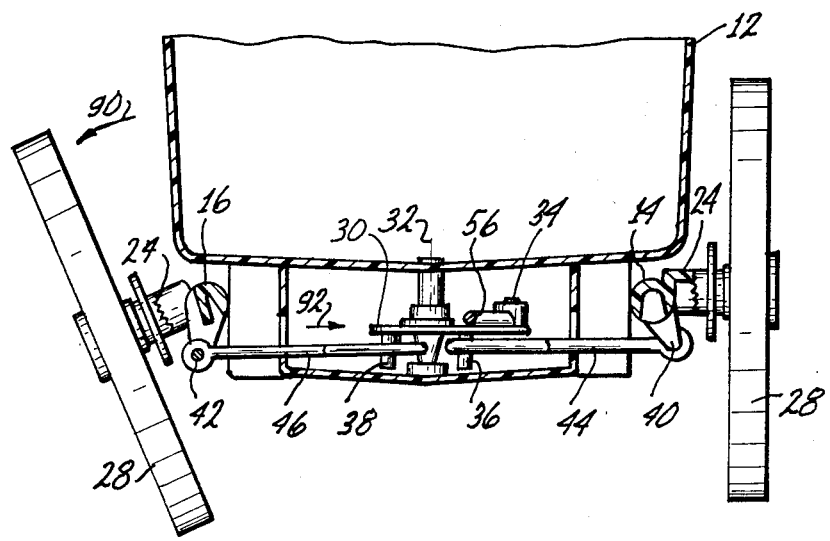
FIG. 7 is a partial rear elevational view of the toy vehicle of FIG. 1, with part of the vehicle shown in cross-section, showing how the wheels on just one side of the vehicle can be folded.

A pivot plate 30 is rotatably mounted to body portion 12 about vertical axis 32. Any desirable method of rotatably mounting the plate 30 to body portion 12 may be used. The plate 30 has attached to it one upwardly extending pin 34 and two downwardly extending pins 36 and 38 as shown in FIGS. 3, 6 and 7.

As best shown in FIG. 2, the elongated axle members 14 and 16 have connecting extensions 40 and 42, respectively, attached thereto. Two slotted links 44 and 46 are rotatably coupled to the connecting extensions 40 and 42. One end of each of the slotted links 44 and 46 preferably has an aperture passing through it. The extensions 40 and 42 rotatably engage the apertures at the ends of the links 44 and 46 as shown in FIGS. 3, 6 and 7. The other end of each of the links 44 and 46 has an elongated slot 48 passing through it. Pins 36 and 38 operably engage the slots 48 in the links 44 and 46 as shown in FIG. 2.

Figure 4:
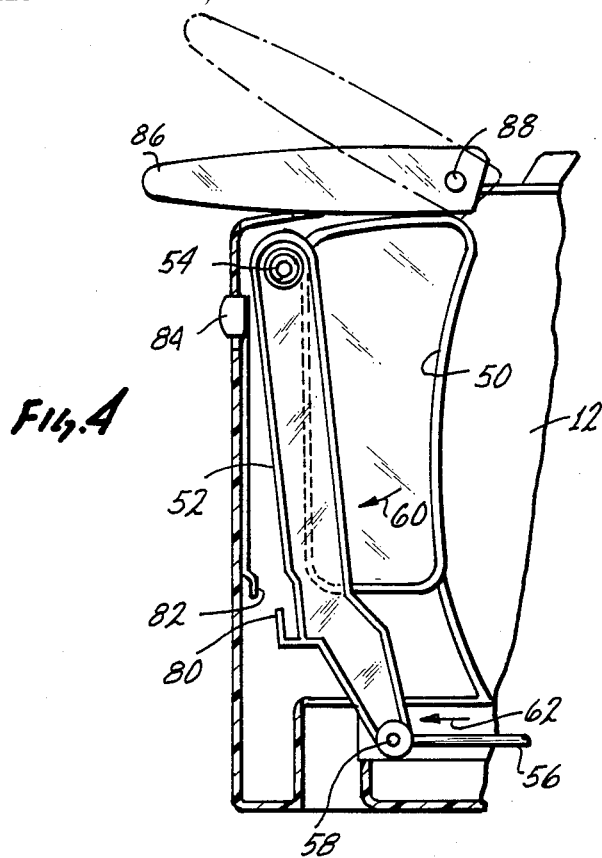
FIG. 4 is a cross-sectional view taken in the direction of arrows 4—4 shown in FIG. 2 illustrating how the hand grip of the toy vehicle of FIG. 1 operates.

FIG. 4 shows a hand grip used for the toy vehicle 10. The hand grip uses an aperture 50 in the body portion 12 in order to provide access for the fingers of a child playing with the toy 10. One end of a trigger member 52 is rotatably engaged to the body portion 12 at pivot point 54. The other end of trigger member 52 has one end of a trigger link 56 attached to it at point 58. The other end of link 56 is connected to pin 34 attached to plate 30.

Figure 5:
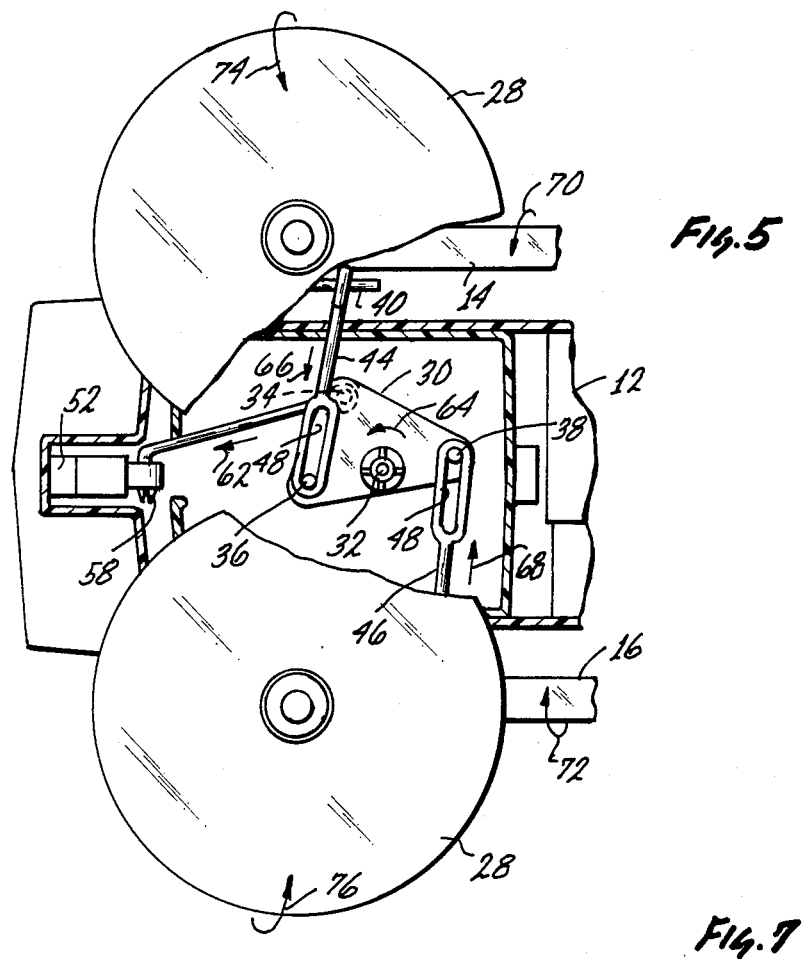
FIG. 5 is a bottom plan view of the rear end of the toy vehicle of FIG. 1 showing two rear wheels of the vehicle in a folded position.

Wheels 26 and 28 are shown orientated in a vertical position in FIGS. 1, 2 and 3. When the wheels are in this position, the toy vehicle 10 can be used as a ground vehicle and rolled along a supporting surface during play. However, the orientation of the wheels may be changed by simply squeezing the hand grip shown in FIG. 4 until trigger member 52 moves in the direction of arrow 60 pivoting about point 54. As a result, link 56 is pulled so that it moves in a substantially horizontal plane in the direction of arrow 62. Since link 56 is connected to pin 34, the movement of link 56 causes plate 30 to rotate in the direction of arrow 64 about axis 32 as shown in FIGS. 5 and 6. The rotation of plate 30, in turn, causes pins 36 and 38 to react with slotted links 44 and 46 forcing the links to move inwardly in accordance with arrows 66 and 68 as illustrated in FIGS. 5 and 6. The inward movement of links 44 and 46 then causes elongated axle members 14 and 16 to rotate as illustrated by arrows 70 and 72 shown in FIG. 5. Rotation of the axle members 14 and 16 causes the front and rear wheels 26 and 28 to rotate according to arrows 74 and 76 until they reach a substantially horizontal position as shown in FIGS. 5 and 6.

The wheels 26 and 28 will remain in a horizontal position until a child's grip is relaxed. After the grip is relaxed, the wheels 26 and 28 will return to a vertical position as a result of torsion springs 78 coiled around members 14 and 16 and connected to body portion 12 as shown in FIG. 2. The springs 78 hold the wheels 26 and 28 in a vertical position until the hand grip is squeezed hard enough to overcome the forces generated by the springs. The wheels 26 and 28 may be locked in a horizontal position by a hooked extension 82 which may be forced into engagement with a channel 80 attached to member 52 by a push button 84 (see FIG. 4).

When the wheels are locked in a horizontal position, a child may play with the toy pretending that it is a flying vehicle or craft. Also, an adjustable wing 86 rotatably engaged to the top of the body portion 12 at point 88 provides additional play options.

The wheels 26 and 28 at just one side of the toy vehicle may be folded as illustrated in FIG. 7. For example, if wheel 28 shown in FIG. 7 is rotated in the direction of arrow 90, then axle member 16 will also rotate and slotted link 46 will be forced to move inward in the direction of arrow 92. As link 46 moves inward, pin 38 is free to slide in elongated slot 48 (see FIG. 2). Therefore, plate 30 will not be forced to rotate and the wheels 26 and 28 coupled to axle member 14 will remain in the vertical position. As a result, only the wheels 26 and 28 coupled to axle member 16 will rotate. This feature is important, for example, when a child drops the toy vehicle so that the wheels at only one side of the vehicle stike the ground. In such a case, the wheels at only one side of the toy vehicle will collapse, helping to prevent damage to the toy.

The above description discloses the preferred embodiment of the present invention. However, persons of ordinary skill in the toy field are capable of numerous modifications once taught these principles. Accordingly, it will be understood by those skilled in the art that changes in form and details may be made to the above-described embodiment without departing from the spirit and scope of the invention.

We claim:

1. A toy vehicle comprising:
   a body portion;
   two elongated axle members rotatably engaged to said body portion, said axle members located at opposite sides of said body portion;
   front and rear wheels rotatably engaged to said elongated axle members, one each of said front and rear wheels being engaged to each of said axle members;
   folding means operably mounted on said body portion for rotating said wheels from a vertical position to a substantially horizontal position; and
   hand grip means for activating said folding means, said folding means including (a) a pivot plate rotatably mounted to said body portion, said plate having pins attached thereto, (b) two slotted links each having an elongated slot passing through one end thereof, each of said elongated slots operably engaging one of said pins attached to said plate and the other end of each of said slotted links rotatably engaged to one of said elongated axle members, and (c) a trigger link having one end thereof engaged to one of said pins attached to said plate and the other end thereof engaged to said hand grip means.

2. The toy vehicle of claim 1 wherein said hand grip means includes a trigger member having one end thereof rotatably engaged to said body portion and the other end thereof attached to said trigger link.

3. The toy vehicle of claim 2 further comprising an adjustable wing rotatably engaged to the top of said body portion.

4. A toy vehicle comprising:
   a body portion;
   two elongated axle members rotatably engaged to said body portion, said axle members located at opposite sides of said body portion;
   front and rear wheels rotatably engaged to said elongated axle members, one each of said front and rear wheels being engaged to each of said axle members;
   a pivot plate rotatably mounted to said body portion;
   link means rotatably engaged to said elongated axle members and operably coupled to said pivot plate for rotating said wheels from a vertical position to a substantially horizontal position;
   hand grip means operably coupled to said pivot plate for causing said pivot plate to rotate; and
   spring means for returning said wheels to said vertical position, said pivot plate having pins attached thereto and said link means including two slotted links each having an elongated slot passing through one end thereof, each of said elongated slots operably engaging one of said pins attached to said plate and the other end of each of said slotted links rotatably engaged to one of said elongated axle members.

5. The toy vehicle of claim 4 further comprises a trigger link having one end thereof engaged to one of said pins attached to said plate and the other end thereof engaged to said hand grip means.

6. A toy vehicle, comprising:
- a body portion having a large aperture passing therethrough near the rear end thereof;
- two elongated axle members rotatably engaged to said body portion, said axle members located at opposite sides of said body portion, each of said axle members having front and rear axles attached thereto;
- front wheels rotatably engaged to said front axles;
- rear wheels rotatably engaged to said rear axles;
- a pivot plate rotatably mounted to said body portion, said plate having pins attached thereto;
- two slotted links each having an elongated slot passing through one end thereof, each of said elongated slots operably engaging one of said pins attached to said plate and the other end of each of said slotted links rotatably engaged to one of said elongated axle members;
- a trigger link having one end thereof engaged to one of said pins attached to said plate;
- a trigger member located adjacent said large aperture in said body portion, said trigger member having one end thereof rotatably engaged to said body portion and the other end thereof attached to the other end of said trigger link; and
- two torsion springs, each of said springs being attached to one of said elongated axle members and to said body portion.

* * * * *